W. L. COLE.
METHOD OF SECURING ATTACHMENTS TO IRON OR STEEL PLATES HAVING HARDENED SURFACES.
APPLICATION FILED MAY 28, 1918.
1,392,300. Patented Oct. 4, 1921.
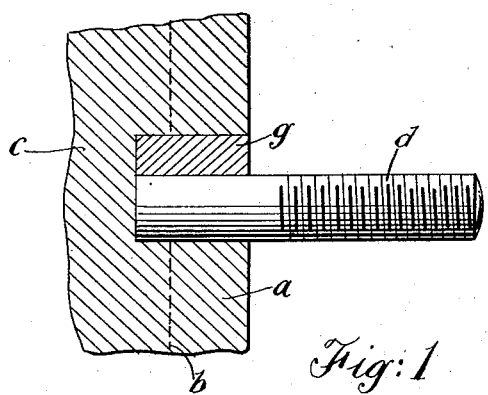
Fig: 1.
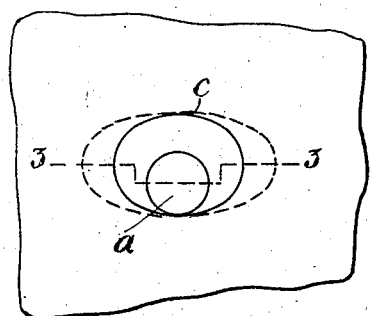
Fig: 2.
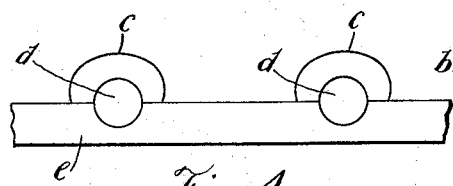
Fig: 4.
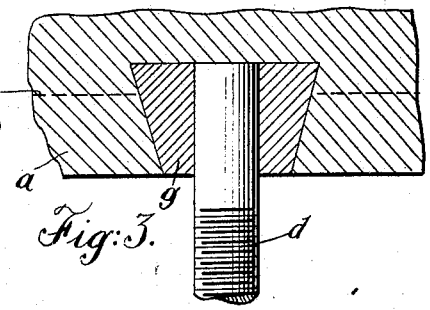
Fig: 3.
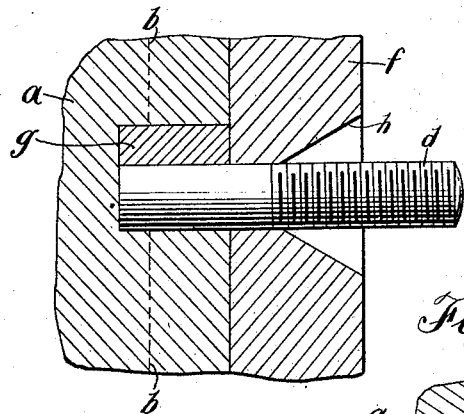
Fig: 5.
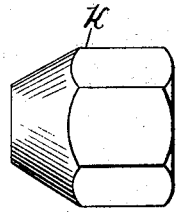
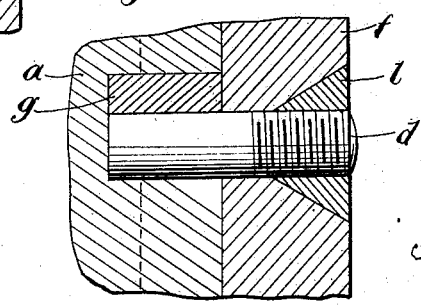
Fig: 6.
INVENTOR
William Lawes Cole
BY
Kenyon & Kenyon
his ATTORNEYS

UNITED STATES PATENT OFFICE.

WILLIAM LAWES COLE, OF MILE END, EAST LONDON, ENGLAND, ASSIGNOR TO QUASI-ARC COMPANY, LIMITED, OF LONDON, ENGLAND.

METHOD OF SECURING ATTACHMENTS TO IRON OR STEEL PLATES HAVING HARDENED SURFACES.

1,392,300. Specification of Letters Patent. Patented Oct. 4, 1921.

Application filed May 28, 1918. Serial No. 237,135.

*To all whom it may concern:*

Be it known that I, WILLIAM LAWES COLE, a subject of the King of England, and residing at Clinton Road, Mile End, East London, England, have invented certain new and useful Improvements Relating to Methods of Securing Attachments to Iron or Steel Plates Having Hardened Surfaces, of which the following is a specification.

This invention relates to a method of securing attachments to iron or steel plating which is too hard at its surface to permit of drilling and inserting studs or bolts.

The invention may be of use, for example, in securing attachments or further plates to armor plating, the surface of which is of high carbon steel of very great hardness, so that it cannot be cut by any tool.

According to this invention a method of electric welding is employed, which avoids the necessity for operating upon the hard metal surface with any tools, but enables attachments to be secured to the plating in a strong and efficient manner.

The invention is illustrated in the accompanying drawing wherein:—

Figure 1 shows in section the method of securing a stud in the plating.

Fig. 2 is a face view of one of the holes with a stud therein.

Fig. 3 shows a cross section on the line 3—3 of Fig. 2.

Fig. 4 shows a jig for holding several studs ready for welding in place.

Figs. 5 and 6 are sectional views corresponding to Fig. 1, showing subsequent stages in the operation.

In the drawings, $a$ represents a surface-hardened plate such as armor plating. In this, the hardening extends say for one and a half inches inward from the surface as indicated by the dotted line $b$. Nothing can be secured to this hardened surface by welding, as the welding deposit if applied, merely breaks away a portion of the hardened metal with it when any stress is applied to it. If, however, the high-carbon steel at the surface could be pierced, the milder metal at the rear would serve for effecting a secure attachment by welding. This is carried out according to the present invention as follows:

Holes are burnt or fused out at the required distance apart for studs which will provide a secure attachment for the further plate or other object to be mounted on the hardened plate. For burning the holes through the hardened layer of metal, any suitable welding electrodes may be employed. The electrodes are preferably moistened in order that an oxidizing action may take place, and a heavier electric current is used than is required for effecting electric welding. In this way a series of holes is formed preferably of the shape indicated at $c$ in Figs. 1 to 3, and extending to a depth well beyond the plane indicated at $b$ where the surface hardening ceases. The holes are oval in form and undercut at the inner end, so that when a stud such as $d$ is laid in one of the holes, there will be space enough above and at each side of it for inserting and manipulating a welding electrode in the hole. A series of such studs is placed in the row of holes, and held in the right position for fitting in corresponding holes in the object to be attached. The holding may be accomplished by the use of a suitable support or jig such as is indicated at $e$ in Fig. 4. Each hole $c$ is then filled up solidly around the stud $d$ with welding metal, built up from the rear where it coalesces with the milder backing metal of the armor plate $a$, until a conical-ended block $g$ of metal is formed. The stud $d$ is welded to the backing metal, and keyed into the hardened surface metal so that it cannot possibly pull out.

The studs $d$ are all preferably screw threaded, as indicated, and the object to be attached, for example a further plate $f$, is now applied, with its ready-formed holes fitting over the studs $d$ as they project from the plate $a$. The holes in the plate $f$ are chamfered out at the front as at $h$, Fig. 5, and nuts preferably formed with coned ends as shown in Fig. 5, are now applied to all the projecting studs, and are screwed up tightly to secure the plate $f$ firmly in position. The surfaces of the welds $g$ are, of course, smoothed or filed flat if necessary before the plate $f$ is applied.

Finally, the nuts $k$ are removed one by one, and the annular spaces provided by the chamfered holes $h$ are filled in with deposits of welding metal $l$, Fig. 6, which draw the plate $f$ even more tightly against the plate $a$ as the heated studs $d$ and the deposited metal cool. Removing the nuts $k$ only one by one as the welds are made, prevents any risk of the stresses due to the heating and cooling in the welding operation distorting the plate $f$ and so interfering with its proper positioning. When all the welds are made, or as each nut is removed and before the welding which replaces it is effected, the projecting ends of the studs $d$ can be cut off flush or nearly so, leaving a finished attachment such as is seen in section in Fig. 6.

If the object $f$ which is secured is a bracket or the like, it can be employed in turn for supporting any other object or plate which it is required to mount upon the hard-surfaced plating $a$. The holes $c$ are not necessarily of the precise shape shown, and they might be circular and conical for example, with the studs $d$ placed at the center. This would usually necessitate the use of larger holes and would result in more labor and expenditure upon electrodes in the cutting and subsequent welding operation, so that holes of the general shape indicated are preferred. The undercutting is important in keying the welding deposits $g$ in position, but it is of even greater importance to insure that each hole $c$ extends beyond the very hard surface layer of the plate $a$ into the milder metal at the rear, as otherwise no reliable attachment would be made. The studs $d$ are not necessarily placed in straight rows of course, but their number and disposition will depend upon the form and mass of the object to be attached, or the stresses to be borne subsequently.

For some purposes possibly it might be sufficient to leave the nuts $k$ to support the attached object $f$, without replacing them by welds such as $l$, but for most purposes such welds will be required to complete the attachment in a permanent manner, and to secure the object $f$ in the strongest possible manner to the plating $a$. The inner ends of the studs $d$, instead of being cut off straight as indicated, might have any suitable or desired shape in order to firmly secure them in place. For most purposes plain ended studs $d$ as indicated will be sufficient.

The welding is preferably effected by the quasi method, with the use of electrodes such as are set forth in the specifications of British Patents Numbers 1274 of 1912, 11079 of 1912, and 13,583 of 1914. Any suitable electrodes may be used for burning out the recesses into which the studs are to be welded.

Having described my invention, what I claim as new and desire to secure by Letter Patent is:

1. The method of securing attachment to surface hardened plating, consisting in making holes in the plating, welding studs in said holes, and securing the attachment to said studs.

2. The method of securing attachments to surface hardened plating, consisting in making holes in the plating, said holes being undercut and larger within the plating than at the surface, welding studs in said holes with deposited welding metal and securing the attachment to said studs.

3. The method of securing attachments to surface hardened plating, consisting of inserting studs in holes cut into the plating, keying the studs in place with deposited welding metal, and securing the attachment to said studs.

4. The method of securing attachments to surface hardened plating, consisting in inserting studs in holes cut into the plating, said holes being undercut and larger within the plating than at the surface, keying the studs in said holes with deposited welding metal, and securing the attachment to said studs.

5. The method of uniting two metal plates together which consists in making registering holes in the plates, placing studs in one of the plates, welding the studs to the plate while holding a plurality of the studs rigidly in positions to register with the holes in the attachment through which the studs subsequently pass.

6. The method of securing together two metal plates which consists in fastening a plurality of studs to one of the plates, making holes in the other plate and chamfering recesses in the exterior surface of the plate around the holes, placing the attachment in position with the studs projecting through the holes in the attachment, fastening the attachment in place with nuts on the studs, removing the nuts one at a time and filling the chamfered recesses with deposited welding metal.

7. A composite metal structure comprising a plate with a hard surface layer and a softer layer, an attachment adjacent to the hard layer, and studs passing through the hard layer of said plate and welded to the softer layer which said studs also pass through the attachment and are welded into recesses chamfered in the exterior surface thereof.

8. A composite metal structure comprising a plate with a hard surface layer and a softer layer, an attachment adjacent to the hard layer, and studs passing through the hard layer of said plate and welded to the softer layer and keyed into the hard surface layer with deposited welding metal.

9. A composite metal structure comprising a plate having a hard surface layer and a softer layer, an attachment adjacent to the hard layer and projections from the said attachment extending through the hard layer of the plate and welded to the softer layer.

10. A composite metal structure comprising a plate with a hard surface layer and a softer layer, an attachment adjacent the hard layer and studs passing through the hard layer and also through the attachment, one end of said studs being welded to said soft layer and the other end fastened to the attachment.

11. A composite metal structure comprising a plate with a hard surface layer and a softer layer, an attachment adjacent the hard layer and studs passing through the hard layer and also through the attachment, one end of said studs being welded in undercut holes in said soft layer and the other end being welded in chamfered recesses in said attachment.

12. The method of securing attachments to surface hardened plating consisting in making holes in the plating by fusing the metal, welding studs in said holes and securing the attachment to said studs.

13. The method of securing attachments to surface hardened plating consisting in anchoring studs in holes produced in said plating by fusion of the metal and securing the attachments to the studs by welding.

In testimony whereof, I have signed my name to this specification.

WILLIAM LAWES COLE.

Correction in Letters Patent No. 1,392,300.

It is hereby certified that in Letters Patent No. 1,392,300, granted October 4, 1921, upon the application of William Lawes Cole, of Mile End, East London, England, for an improvement in "Methods of Securing Attachments to Iron or Steel Plates having Hardened Surfaces," an error appears in the printed specification requiring correction as follows: Page 2, line 57, for the number "13,583" read *13,538;* and that the said Letters Patent should be read with this correction therein that the same may conform to the record of the case in the Patent Office.

Signed and sealed this 15th day of November, A. D., 1921.

[SEAL.]

KARL FENNING,
*Acting Commissioner of Patents.*